United States Patent [19]

Abbuhl et al.

[11] 3,960,413
[45] June 1, 1976

[54] SERIES ROLL BODY CONVEYANCE

[75] Inventors: Hermann Abbuhl, Steffisburg; Hans Tanner, Heimberg, both of Switzerland

[73] Assignees: Hydrel AG, Romanshorn; W. Schneeberger AG, Roggwill, both of Switzerland

[22] Filed: July 7, 1975

[21] Appl. No.: 593,862

Related U.S. Application Data

[63] Continuation-in-part of Ser. No. 416,942, Nov. 19, 1973, abandoned.

[30] Foreign Application Priority Data

Nov. 17, 1972 Switzerland.................... 16899/72

[52] U.S. Cl. ................................ 308/3 A; 308/6 R; 308/207 R
[51] Int. Cl.² .......................................... F16C 21/00
[58] Field of Search ........ 308/3 R, 3 A, 6 R, 207 R, 308/207 A; 193/1, 3 B, 40, 35 R, 35 A, 35 B, 37

[56] References Cited

UNITED STATES PATENTS

| | | | |
|---|---|---|---|
| 3,003,827 | 10/1961 | Hentschke.......................... | 308/6 B |
| 3,778,121 | 12/1973 | Levesque ........................... | 308/6 R |
| 3,790,233 | 2/1974 | Polidor.............................. | 308/6 R |

*Primary Examiner*—M. H. Wood, Jr.
*Assistant Examiner*—Gene A. Church
*Attorney, Agent, or Firm*—Haseltine, Lake & Waters

[57] ABSTRACT

A roller body cage, such as a linear bearing cage rail structure having a series of roller bodies which are separated from each other by interposed spacer inserts, and which are prestressed in the longitudinal axial direction of the cage rail through the intermediary of one or more spring elements so as to provide a frictional force between the roller bodies and spacer inserts.

3 Claims, 5 Drawing Figures

SERIES ROLL BODY CONVEYANCE

CROSS-REFERENCE TO RELATED APPLICATIONS

This application is a continuation-in-part application of Ser. No. 416,942; filed Nov. 19, 1973, now abandoned.

FIELD OF THE INVENTION

The present invention relates to a roller body cage and, more particularly, a bearing cage rail structure including a friction damping arrangement, and which is adapted to be utilized for the support of linearly movable machine tool elements.

DISCUSSION OF THE PRIOR ART

Roller body cages, including linear bearing cage rail structures, are extensively utilized as machine components for facilitating the easy movement of carriage-like machine tool and machine elements, such as machine slides supported on a machine bed, for example, as shown in U.S. Pat. Nos. 3,778,121 and 3,236,569. During the relative sliding movement between the various machine elements, the coefficient of friction generally has a magnitude of approximately 0.1, whereas this value, for roller body cages and cage rail structures, lies within the range of magnitudes of 0.001 to 0.002. This extremely low coefficient of friction, however, also reduces the damping or restraining properties of the linear roller body cage or cage rail structure to a value which is frequently inadequate.

The foregoing disadvantage is countered by coupling or interposing damping elements intermediate the stationary and moving components of the machine structure, which generate damping or restraining effects through either auxiliary gaseous, liquid or dry-friction. With respect to the definition of the term damping or restraint, there is to be understood herein that this relates to a force which acts in opposition to the movement of masses which have been placed into oscillations, so that these movements gradually decrease.

The connection of the damping elements to the slide or relatively moving components of the machine is, on the one hand, extremely expensive and, on the other hand, is generally effectuated by means of connecting elements which, due to a lack of rigidity, may cause so-called "stick slip" effects on the movements of the carriage or slide into a definite position on the machine bed. Frequently, the damping effect of the damping elements which have been interconnected also is not adjustable, which may similarly provide disadvantageous and undesirable operating results.

SUMMARY OF THE INVENTION

Accordingly, it is an object of the present invention to provide a roller body bearing cage and, in particular, a linear cage rail structure which is adapted to be utilized for supporting slides or carriages on the beds of machine tools, and which incorporates a technologically improved and adjustable damping arrangement.

It is a more specific object of the present invention to provide a roller body cage, such as a linear bearing cage rail structure having a series of roller bodies which are separated from each other by interposed spacer inserts, and which are prestressed in the longitudinal axial direction of the cage rail through the intermediary of one or more spring elements so as to provide a frictional force between the roller bodies and spacer inserts.

Another object of the present invention is to provide a roller body cage or bearing cage rail structure of the above-mentioned type, in which the spring elements may be constructed so as to be either fixed, as well as being adjustable for varying the axial compressive force they exert on the roller bodies and spacer inserts.

BRIEF DESCRIPTION OF THE DRAWINGS

Reference may now be had to the following detailed description of the preferred embodiments of the invention, taken in conjunction with the accompanying drawings; in which.

DETAILED DESCRIPTION

Figure 1:
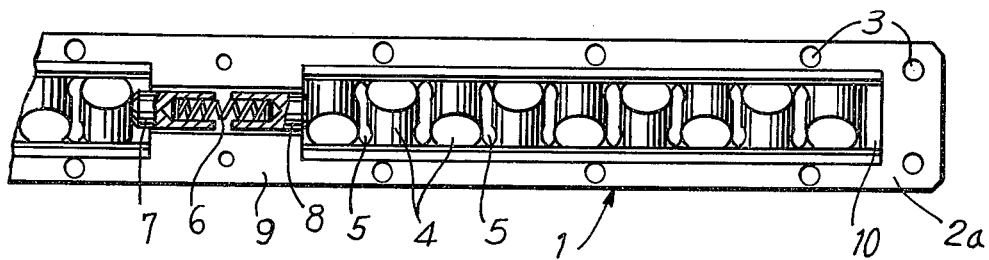
FIG. 1 is a side view of a linear roller body cage, partly in section, pursuant to the invention.
Figure 2:
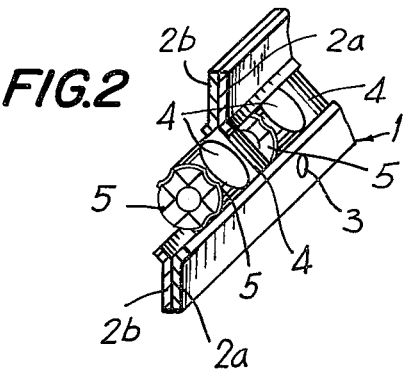
FIG. 2 is a perspective view of a cross-section taken through the roller body cage of FIG. 1.
Figure 3:
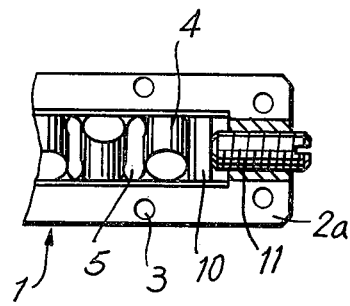
FIG. 3 is a side view, partly in section, of an end portion of another embodiment of the roller body cage of FIG. 1 with an addition compression screw.

Referring now in detail to the drawings, the roller body cage 1 illustrated in FIGS. 1 through 3 includes two support plates 2a, 2b which are interconnected by means of rivets 3 and form a linear or elongate cage rail. Interposed in the space between V-shaped outwardly bent inner ends of the support sheets 2a, 2b, as shown in FIG. 2, are roller-shaped or cylindrical roller bodies 4 whose axis alternatingly cross. Respectively interposed between each of the individual roller bodies 4 are spacer inserts 5 which may be formed, for example, of a plastic material or even metal.

Supported with a connector or transverse web portion 9 of the cage rail are pins 7, 8 in a manner so as to be axially movable therein. The pins 7, 8 are pressed apart through the intermediary of a prestressed helical or coiled spring 6 so as to exert a compressive force on the roller bodies 4 and the spacer inserts 5 in the longitudinal direction of the cage rail. The series or row of roller bodies 4 and spacer inserts 5 are thereby pressed against an end contact plate or member 10 and are continually subjected to a compressive force. Due to this compression there is thus generated a frictional force between the individual roller bodies 4 and the spacer inserts 5 responsive to relative rotation between these elements 4 and 5 which, for a roller body cage 1 or cage rail, when assembled in a machine element slide or carriage support of the above-mentioned type, exerts a braking effect on the relative movement between the various bearing components of the machine.

In a somewhat modified embodiment as shown in FIG. 3, an adjusting screw 11 is provided and mounted at the end of the cage rail 1. By means of either increased or reduced threading-in of this adjusting screw into the cage rail, the degree of compression which is exerted on the roller bodies 4 and spacer inserts 5 may thus be varied so as to resultingly change the braking characteristics or effect thereof.

Figure 4:
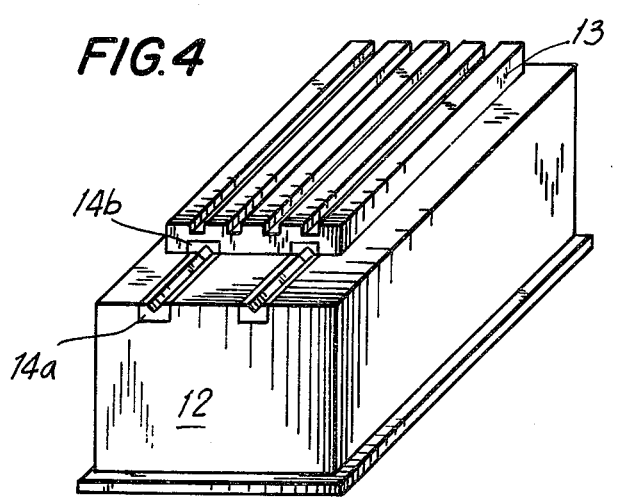
FIG. 4 is a perspective view of a machine tool bed with a longitudinally movable carriage or slide which is supported on the bed through the inventive roller body cages.
Figure 5:
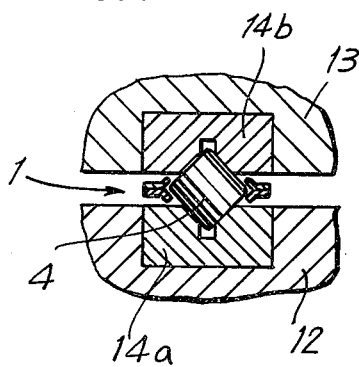
FIG. 5 is an enlarged cross-section through a support location for the slide.

Illustrated in FIGS. 4 and 5 of the drawings is a utilitarian example for the inventive roller body cage or bearing cage rail. Thus, FIG. 4 illustrates a bed 12 of a work tool machine on which there is supported a slide or carriage 13 so as to be longitudinally movable therealong. The bed 12 and the carriage 13 are provided with guide rails 14a, 14b within which there is located the inventive roller body cage or cage rail structure. FIG. 5 illustrates the assembly of the roller body cage in the guide rails 14a, 14b.

Through the assembly of the inventive roller body cage, including the roller bodies 4 and spacer inserts 5 which are subjected to compression, there may be achieved a damping or restraint on the movement of the carriage 13 on the bed 12 without the need to utilize auxiliary damping means, such as hydraulic damping oscillators and the like.

While there has been shown what is considered to be the preferred embodiment of the invention, it will be obvious that modifications may be made which come within the scope of the disclosure of the specification.

What is claimed is:

1. In a roller bearing cage for the support of linearly conveyed machine elements, such as machine tool carriages and the like; including elongate cage rails; and a series of roller bodies being supported between said rails, the improvement comprising: spacer means in said cage positioned intermediate each of said roller bodies; said spacer means being in contact with said roller bodies, said series of roller bodies and spacer means being positioned so as to generate a frictional force responsive to relative rotation between said spacer means and said roller bodies; and at least one prestressed spring means in said cage for exerting a constant compressive spring force on said roller bodies and spacer means in the longitudinal direction of said cage.

2. A cage as claimed in claim 1, comprising adjusting means on at least one end of said cage for varying the spring force of said spring means.

3. A cage as claimed in claim 2, said adjusting means comprising a set screw.

\* \* \* \* \*